April 18, 1939. A. N. KLYVER 2,154,853
CONVEYER MECHANISM
Filed March 6, 1937 8 Sheets-Sheet 4
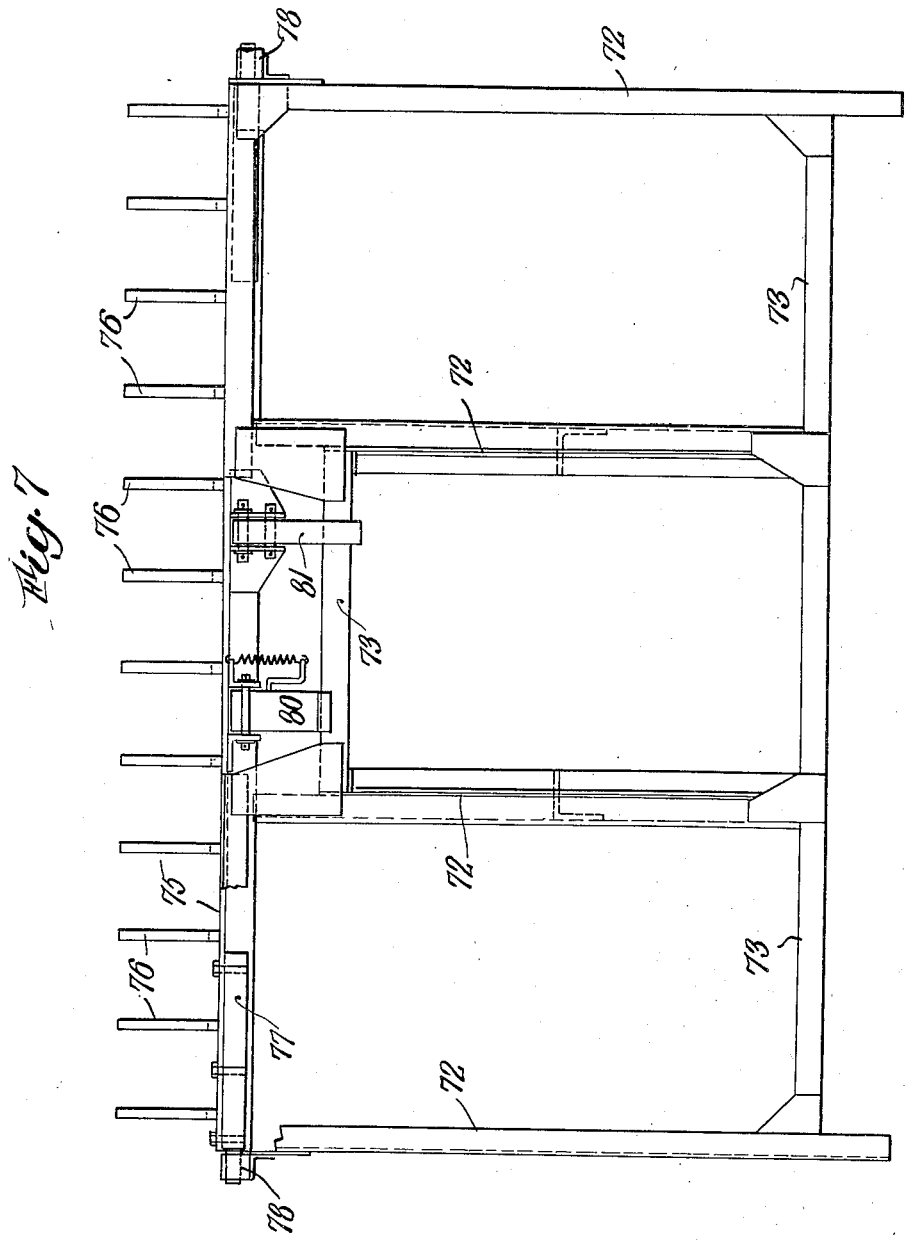

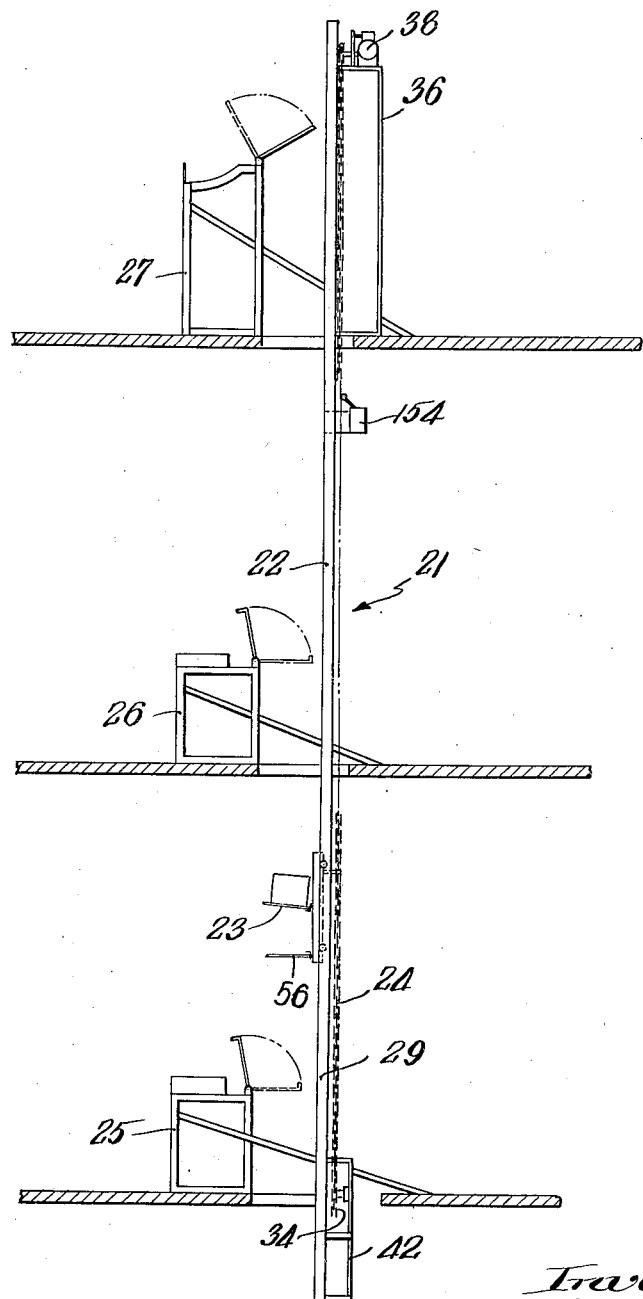

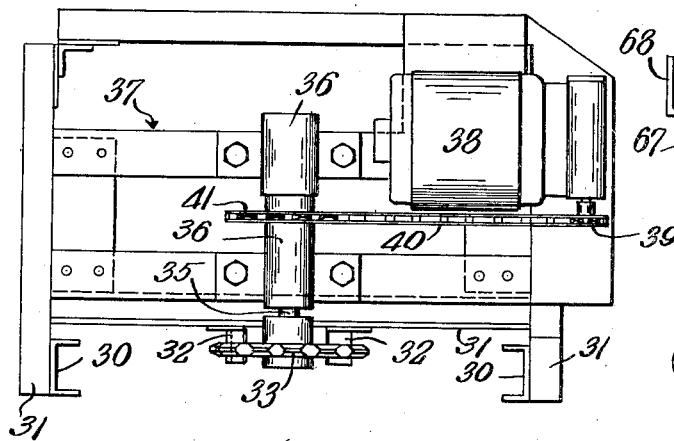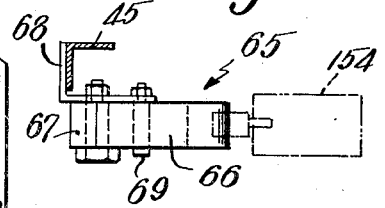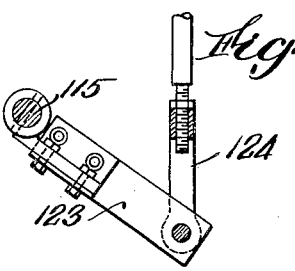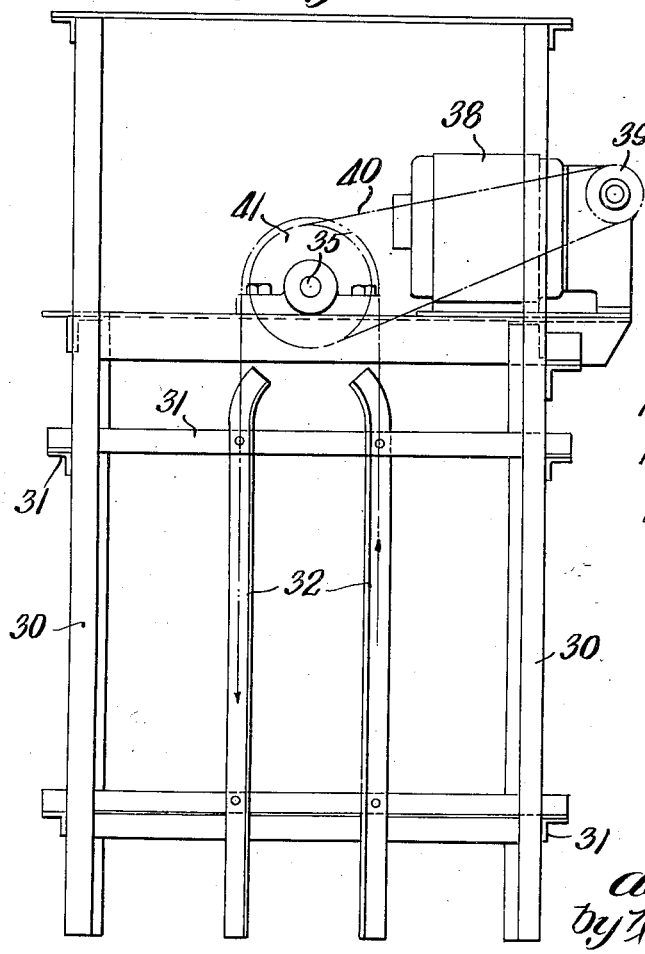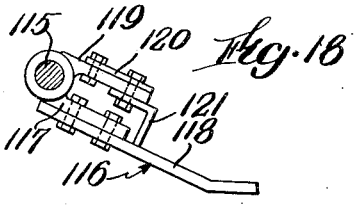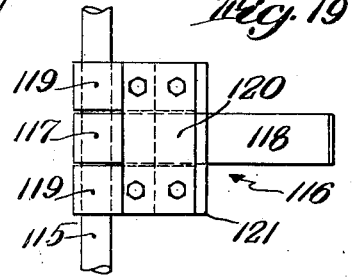

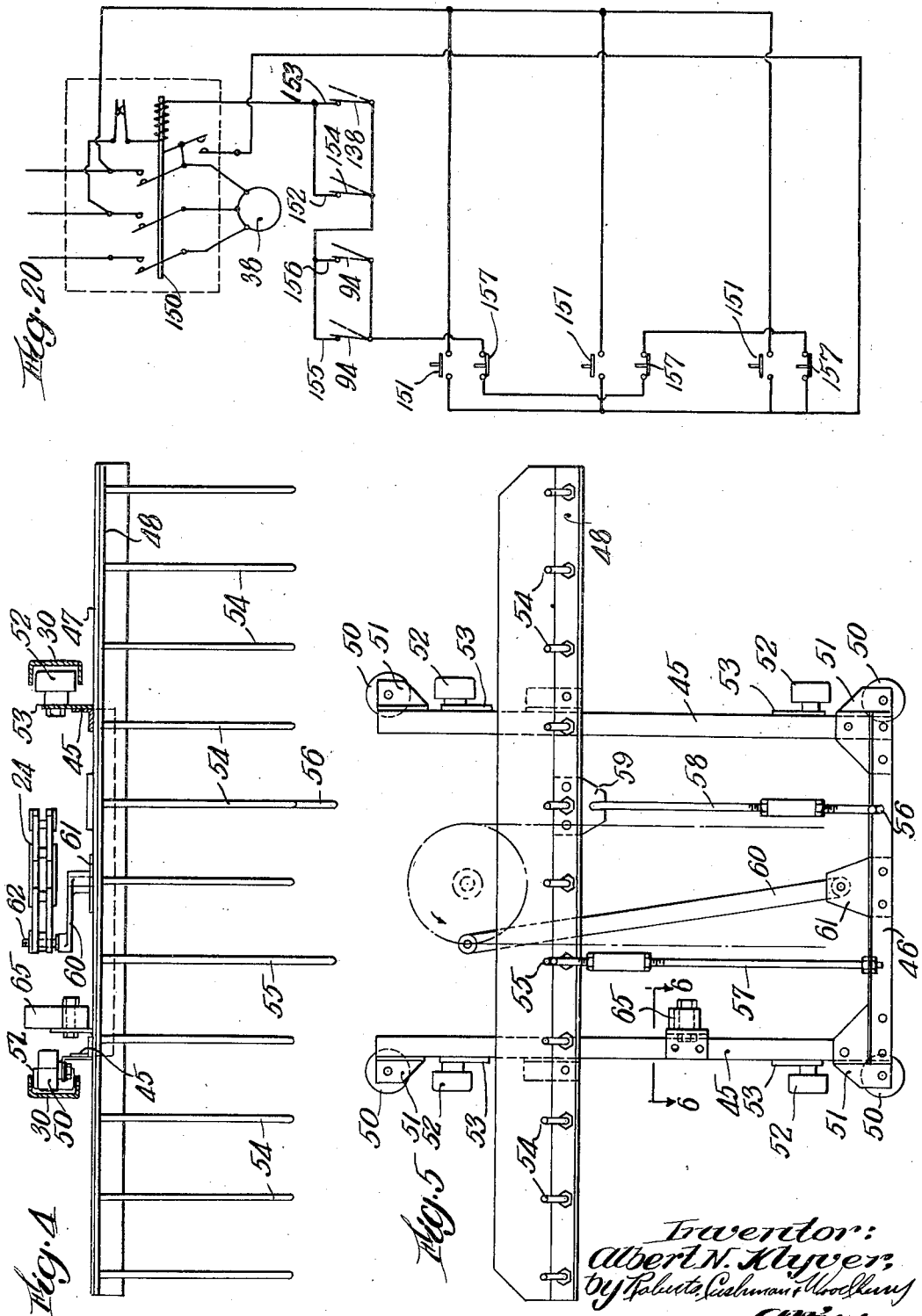

April 18, 1939.  A. N. KLYVER  2,154,853
CONVEYER MECHANISM
Filed March 6, 1937   8 Sheets-Sheet 5
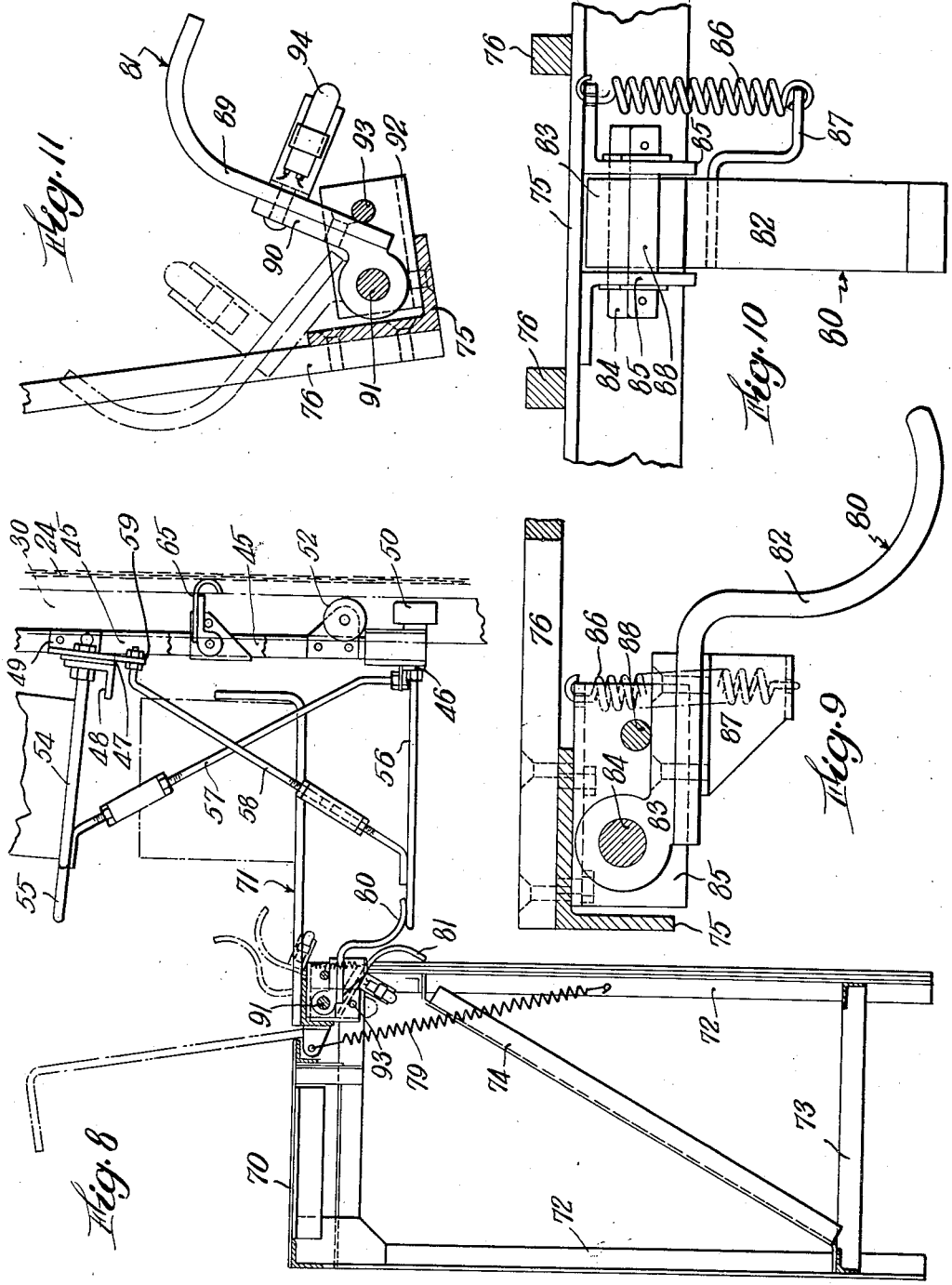

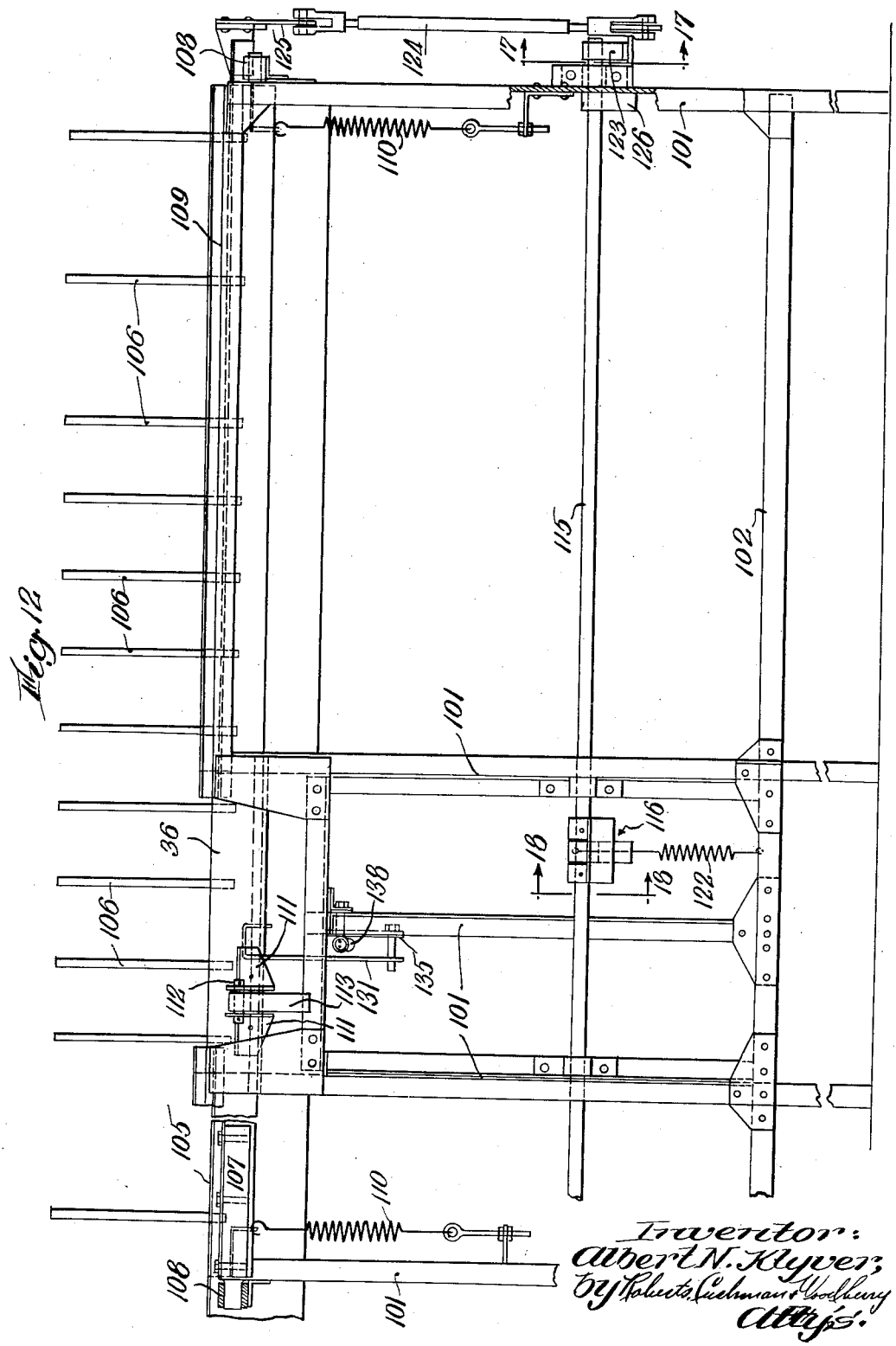

April 18, 1939.  A. N. KLYVER  2,154,853
CONVEYER MECHANISM
Filed March 6, 1937  8 Sheets-Sheet 7
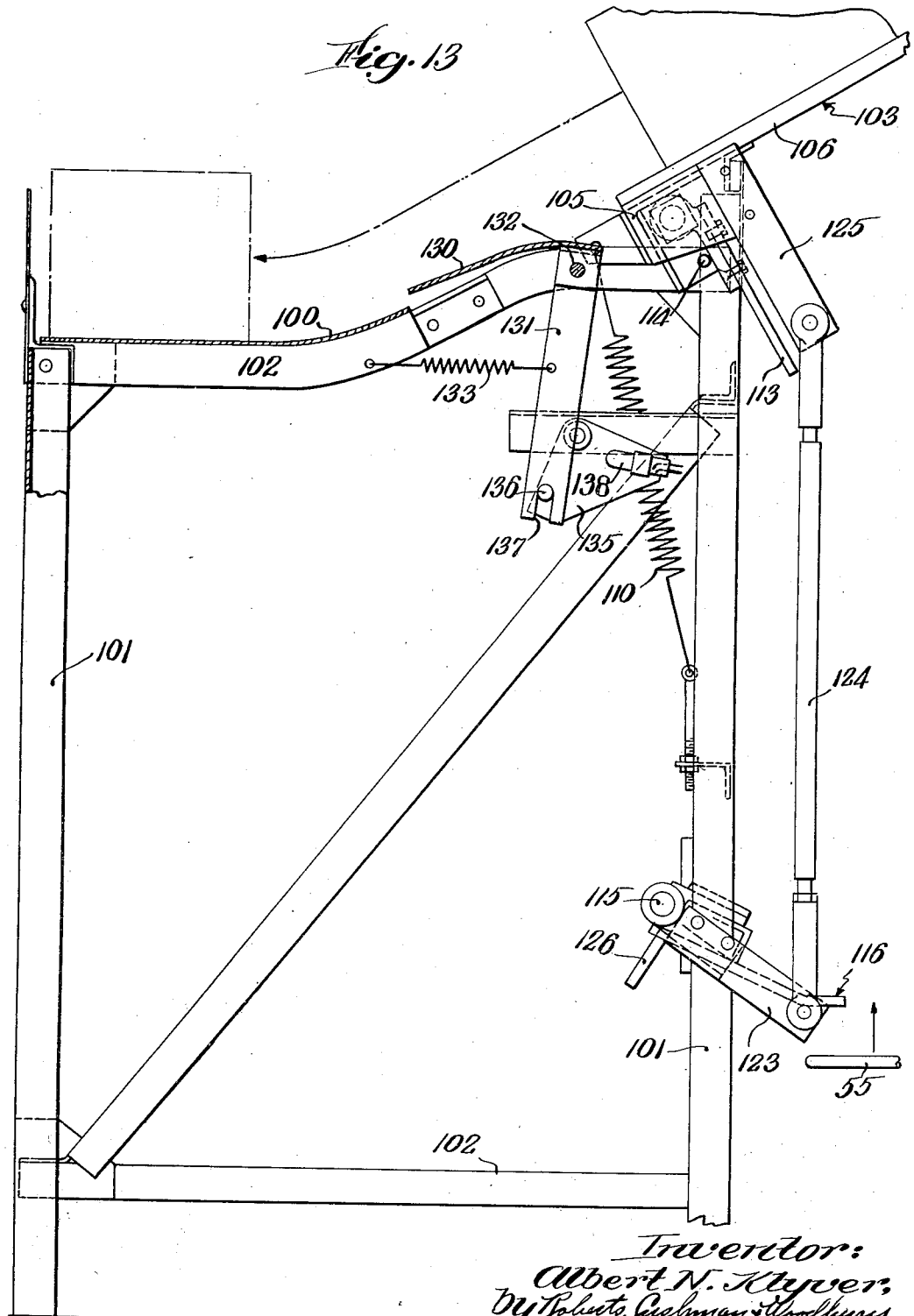

April 18, 1939.  A. N. KLYVER  2,154,853
CONVEYER MECHANISM
Filed March 6, 1937  8 Sheets-Sheet 8
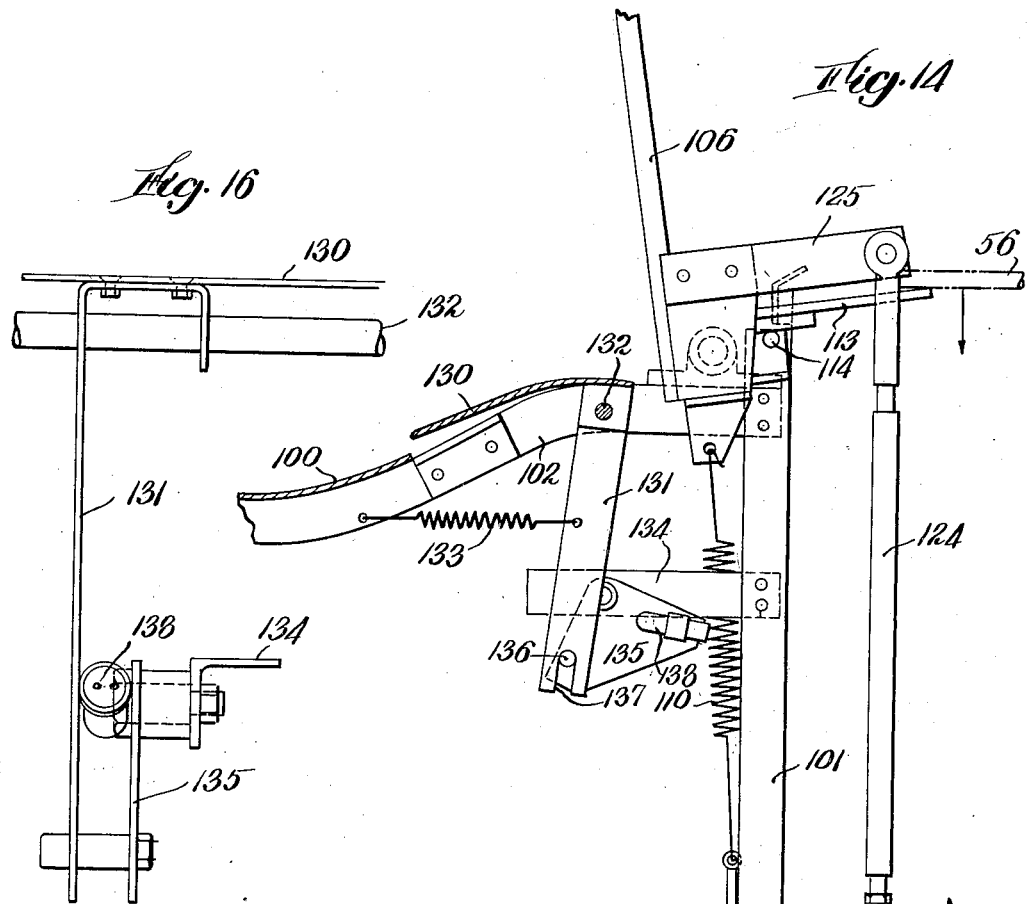
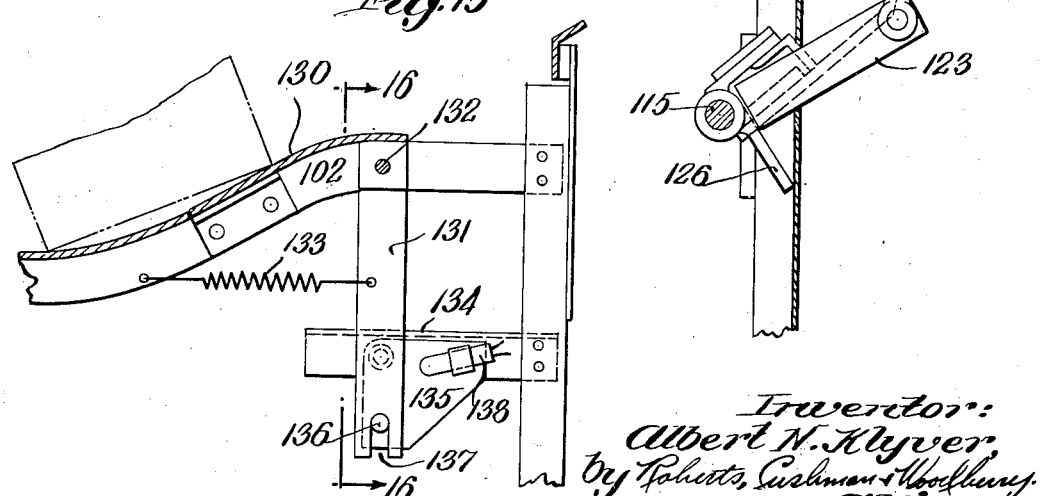
Inventor:
Albert N. Klyver
by Roberts, Cushman & Woodbury
Attys.

Patented Apr. 18, 1939

2,154,853

UNITED STATES PATENT OFFICE 2,154,853

CONVEYER MECHANISM

Albert N. Klyver, Syracuse, N. Y., assignor to The Lamson Company, Syracuse, N. Y., a corporation of Massachusetts Application March 6, 1937, Serial No. 129,398

18 Claims. (Cl. 214—113)

This invention relates to an improvement in conveyer mechanism and more particularly in a conveyer which comprises a car and means causing said car to reciprocate in a straight line thereby serving two or more stations.

The primary object of this invention is to provide a conveyer including a continuously reciprocating car, a motor continuously running in one direction and means whereby the impulse of the motor is transmitted to the car.

Further objects of the invention reside in the provision of means whereby the car is automatically loaded and unloaded, whereby the path of travel of the car is kept clear, whereby the travel of the car is stopped automatically should such path not be clear and in the details of construction of the conveyer, all as set forth in the following description and disclosed in the accompanying drawings, wherein Fig. 1 is a schematic elevational view illustrating a vertical conveyer embodying this invention;

Fig. 2 is a plan view of such conveyer;

Fig. 3 is a front elevation of the upper end of the conveyer frame;

Fig. 4 is a plan view of the car;

Fig. 5 is a front elevation thereof adjacent the upper end of its travel;

Fig. 6 is an enlarged sectional view taken along the line 6—6 in Fig. 5;

Fig. 7 is a front elevation of a loading station with parts broken away;

Fig. 8 is an enlarged side elevation of a loading platform showing in conjunction therewith a car on its upward travel carrying an article which has been loaded thereon at the station;

Figs. 9 and 10 illustrate in side elevation and front elevation, respectively, a trip at the loading station which is actuated by the car upon its upward travel;

Fig. 11 is a view in side elevation of another trip at the loading station which is actuated by the car upon its downward travel and by which the loading station may be rendered inoperative;

Fig. 12 is a front elevation of an unloading station with parts broken away;

Fig. 13 is an enlarged side elevation of the unloading station in the load receiving position;

Fig. 14 is a similar view of the moving elements of the unloading station in the inoperative position;

Fig. 15 is a similar view showing the unloading station with a load positioned thereon;

Fig. 16 is an enlarged sectional view taken along the line 16—16 in Fig. 15;

Figs. 17 and 18 are enlarged sectional views taken along the lines 17—17 and 18—18, respectively, in Fig. 12;

Fig. 19 is a plan view of the element shown in Fig. 18; and

Fig. 20 is a diagram of an electric circuit which might be employed.

The conveyer 21 here shown comprises a frame 22 in which a car 23 is continuously reciprocated by a chain 24 along a straight line travelling past loading stations 25 and 26 and an unloading station 27. The stations are provided with loading and unloading platforms by which loads are supplied to and removed from the car without interrupting its travel. As here shown the frame extends vertically through three floors and the car travels through openings in the floors to transport loads from the loading stations on the first and second floors to the unloading station on the third floor. The loading is done during the upward travel of the car and the unloading is done during the downward travel of the car.

The frame 22 includes a pair of upright U-shaped tracks 30 for the car mounted with their open sides facing each other and a suitable number of beams 31 connecting and bracing the tracks. Secured to the beams between the tracks are a pair of guide rails 32 for the chain. The chain passes over a head sprocket 33 and a foot sprocket 34. The head sprocket 33 is keyed or otherwise attached to one end of a drive shaft 35 supported in bearings 36 provided on a platform 37 at the upper end of the frame 22. A motor 38 mounted on the platform drives the shaft 35 continuously in one direction through a sprocket 39, chain 40 and sprocket 41. The foot sprocket 34 is mounted in a housing 42 at the bottom of the frame and rotates freely. As shown in Fig. 3 the guide rails 32 are spaced so as to permit the chain to travel freely between the sprockets.

The car 23 comprises a pair of parallel vertical angle bars 45 connected at the bottom by a cross angle bar 46 and somewhat above the middle by a plate 47 and an angle beam 48 attached to the bars 45 by angle brackets 49. Projecting laterally from each bar 45 at top and bottom are rollers 50 which ride in the tracks 30 of the frame and are supported upon angle brackets 51. Adjacent the rollers 50 are guide rollers 52 supported on plates 53, and, like the rollers 50, entering the tracks 30. The rollers 50 and 52 thus cooperate to insure the desired travel of the car.

The load carrying shelf of the car consists of a plurality of fingers 54 and a single finger 55. The fingers are mounted in the cross plate 47 and bar 48 and project outwardly therefrom in a slightly inclined plane as shown in Fig. 8. The finger 55 projects beyond the fingers 54 and not only serves as an element of the shelf but has a further function which will be pointed out below. Mounted on the bar 46 and projecting below the shelf fingers is a finger 56 which is of substantially the same length as the finger 55 and has a function to be pointed out hereinbelow. The fingers 55 and 56 are supported adjacent their outer ends by braces 57 and 58, respectively, which are adjustable in length. The outer end of each brace is secured to the finger with which it is associated. The inner end of the brace 57 is secured to the bar 46 and the inner end of the brace 58 is secured to a plate 59 carried by and projecting downwardly from the cross plate 47.

The car 23 is attached to and suspended from the chain 24 by a bar 60 pivotally attached at the lower end to a pin projecting from a plate 61 on the cross bar 46. At the upper end the bar 60 carries a pin 62 which serves as a link pin for the chain 24. The car is thus positively raised on its upward load carrying travel and descends by gravity and the push exerted by the bar 60. As the pin 62 travels with the chain around the sprockets the bar 60 swings about the pin on the plate 61 as a fulcrum and the speed of travel of the car is reduced below its normal speed. Carried by one vertical bar 45 is a trip finger 65 comprising a plate 66 secured at one end to a pivotally mounted arm 67 and curved at its free end. The arm 67 turns freely on a pin projecting from an angle bracket 68 attached to the bar 45. A stop pin 69 holds the finger 65 normally in the horizontal position shown in Fig. 8 and permits its upward swing when the occasion arises.

The loading stations 25 and 26 are the same in construction and operation with the exception that the station at the first floor is substantially longer than the other station and is adapted to handle loads of greater length and the following detailed description applies to both. Each station comprises a loading platform 70 rigidly supported upon a suitable frame and a loading shelf 71 pivotally supported upon such frame. The frame consists of a plurality of angular uprights 72 connected by cross bars 73 and braces 74. The shelf 71 comprises an angle bar 75 to which are secured one end of each of a plurality of fingers 76 the other ends of which are bent upwardly at right angles thereto (see Fig. 9). Bolted to the ends of the angle bar 75 are bars 77 the ends of which are cylindrical and project beyond the ends of the bars into bearings 78 whereby, as shown in full and dotted lines in Fig. 8, the shelf may be lowered over the floor opening into the path of travel of the car and may be raised therefrom. A spring 79 acts, when the shelf is raised, to urge the shelf 71 into the dotted line position out of the path of travel of the car.

Projecting into such path of travel from the shelf 71 are trip elements 80 and 81. The element 80 is in the path of travel of the finger 56 on the car when the shelf is in the lowered or loading position and the element 81 is in the path of travel of the finger 55 on the car when the shelf is in the raised or inoperative position (see Fig. 8). The element 80 (Figs. 9 and 10) comprises a curved plate 82 and an arm 83 which are firmly joined, and a rod 84 on which the arm is pivotally supported between two angle brackets 85. A spring 86, attached at one end to a bracket 85 and at the other end to a strip 87 secured to the plate 82 and arm 83, normally holds the element 80 in contact with a stop pin 88 carried by the brackets 85. The element 81 (Fig. 11) comprises a plate 89 and arm 90 secured together, pivotally carried by a rod 91 supported by angle brackets 92, and normally resting upon a stop pin 93. Attached to the underside of the plate 89 is a mercury switch 94 which serves as a circuit maker and circuit breaker. The switch 94 may be of any well known form and is so mounted that it is opened when in the positions shown in Figs. 8 and 11 (full line) and is closed when in the position shown in dotted lines in Fig. 11. As will be pointed out below only one of the loading stations can be used in the operation of the conveyer. The trip element 81 of the station not in use must be in the dotted line position (Fig. 11) in order that the motor be operated.

The unloading station (Figs. 12 to 19, inclusive) comprises an unloading platform 100, supported upon a suitable structure including uprights 101 and cross bars 102, and an unloading shelf 103. The shelf 103 is similar in construction to the shelf 71 of a loading station and comprises an angle bar 105, fingers 106, bars 107, bearings 108. The shelf fingers 106 normally rest upon an angular supporting plate 109 carried by uprights 101 and extend over the floor opening into the path of travel of the car at angle of approximately 45° so that any load thereon will tend, under the action of the force of gravity, to slide toward the unloading platform 100. Springs 110 serve when the shelf has been unbalanced to urge the shelf into the position shown in Fig. 14 out of the path of travel of the car.

Pivotally mounted between brackets 111 on a stud 112 carried by the brackets is an element 113 which, when the shelf 103 is raised as shown in Fig. 14, extends into the path of travel of the car finger 56 and which normally rests upon a stop pin 114. On a rock shaft 115 carried in bearings upon certain uprights 101 is an element 116 which, when the shelf is lowered as shown in Fig. 13, extends into the path of travel of the car finger 55. The element 116 comprises an arm 117 freely rotatable on the shaft, a plate 118 fixed at one end to the arm, arms 119 secured to the shaft at each side of the arm 117, a cover plate 120 and a stop plate 121 carried by the arms 119 and a spring 122 by which the plate 118 is held in contact with the stop plate 121 (see Figs. 18 and 19). Fixed at each end of the shaft 115 is an arm 123 only one of which is here shown. Each arm is preferably made in two sections (see Fig. 17) and to it is pivotally secured the lower end of a rod 124. The upper end of the rod 124 is pivotally secured to an arm 125 fixed to one end of the shelf 103. Secured to the shaft 115 adjacent an upright 101 is an arm 126 which, when the shelf is raised to the position shown in Fig. 14, bears against the upright and thus acts as a limit stop.

In case a load upon delivery to the unloading station should not slide completely onto the platform 100 safety means are provided. Such means comprise a curved plate 130 between the platform 100 and the shelf 103 and over which the loads slide. The plate 130 is pivotally secured to cross bars 102 by a looped post 131 suitably secured, as by welding or the like, to the plate 130 and a shaft 132 carried by the cross bars 102. A spring 133 normally raises the plate 130 as shown in Fig. 14. When a load comes in contact with the plate (see Fig. 15) the plate is depressed. Pivotally supported on a bar 134 is plate 135 substantially right angular in form. The plate 135 is connected to the post 131 by a pin 136 and notch 137 and carries a circuit breaker 138 which may be of any desired form being here shown as a mercury switch which is so mounted that the switch is closed when the plate 130 is raised (Fig. 14) and is opened when the plate 130 is depressed (Fig. 15).

The car 23 is continuously reciprocated by the motor 38. Loads are supplied to the car from either of the stations 25 or 26 and are delivered to the unloading station 27.

The positions of the shelves at the loading and unloading stations are determined by the car. Since only one loading station can be used, the shelf 71 of the unused station is raised into the dotted line position shown in Figs. 8 and 11 and the trip element 81 is shifted into the dotted line position shown in Fig. 11.

Let it be assumed that a load is placed upon the shelf 71 of the loading station in use after the car has descended past the station. The car on its upward travel raises the load from the shelf 71 and thereafter the finger 56 on the car engages the trip element 80 and raises the shelf into the position shown in Fig. 8 in dotted lines. The finger 55 on the car engages the trip element 116 at the unloading station and raises the shelf 103 thereat into the position determined by the limit stop 126 as shown in Fig. 14. Upon reaching the upper limit of its path the car starts to descend and the finger 56 on the car engages the trip element 113 causing the shelf 103 to resume the position shown in Fig. 13 whereupon it strips the load from the car. The latter continues its descent and the finger 55 thereon engages the trip element 81 to swing the shelf 71 of the loading station into the lowered position ready to receive another load.

The plate 82 of the element 80 at each loading station is normally engaged by the finger 56 when the car is ascending. It is, however, yieldably mounted so that in case the shelf 71 should have been lowered before the car has descended past the station the plate when engaged by the finger 56 will swing downwardly and inwardly about the rod 84 and, after the finger 56 has passed will be returned to its normal position by the spring 86. The trip element 113 at the unloading station is raised from the pin 114 freely by the finger 56 when the car ascends and drops back as soon as the finger passes. As pointed out above the plate 118 of the trip element 116 at the unloading station is held by the spring 122 in contact with the stop plate 121 so that the engagement of the plate by the finger 55 as the car descends will merely swing the plate downwardly and it will be returned to its normal position after the finger has passed.

The car is reciprocated by the motor 38 the main switch 150 thereof being closed by the depression of any one of the buttons 151 of the start-stop unit provided at each floor. (See Fig. 20.) The current normally flows through a pair of parallel lines 152, 153 which include respectively a circuit breaker 154 and the circuit breaker 138 at the unloading station both being normally closed. The circuit breaker 154 is located in the path of travel of the car between the upper loading station 26 and the unloading station 27 (see Fig. 1). The trip finger 65 on the car engages the circuit breaker as the car passes on both upward and downward travel. The finger 65 is, as pointed out above, so constructed that it will have no effect on the circuit breaker on the downward travel of the car. On the upward travel, however, the finger trips the circuit breaker 154 to open the line 152 and if the load previously delivered at the unloading station should remain on the plate 130 thereby depressing it and tripping the circuit breaker 138 to open the line 153 the circuit is broken and the travel of the car is stopped. The current also flows through a second pair of parallel lines 155 and 156 each of which includes one of the switches 94 at the loading stations. Each switch 94 is open when the loading station with which it is associated is in use. Hence the raising of the trip element 81 and consequent closing of the switch 94 at the loading station which is not in use is essential to close the circuit. This construction provides a further safety guard since if an operator, when one station is in use, should attempt inadvertently to use the other station, the switch 94 at that station would open and break the circuit. An operator at any floor is able to stop the conveyer at any time by depressing the button 157 of any start-stop unit.

It will be noted that the car reciprocates continuously along a straight track being loaded as it ascends and unloaded as it descends, that the shelves of the loading and unloading stations are automatically raised and lowered by the car as it ascends and descends, that the trip elements at the various stations are all yieldably mounted to eliminate breakage should they be struck by the fingers of the car as it travels in a direction opposite to that in which it is desired that the elements actuate the shelves and that the operation of the car is automatically stopped if a load delivered at the unloading station has not moved sufficiently or is too large so that the unloading station is not in condition to receive another load.

While one embodiment of the invention is shown and described it is not limited thereto since other embodiments may be made without departing from the spirit and scope thereof as set forth in the following claims.

I claim:

1. A conveyer comprising a loading station, an unloading station, a car adapted to transport loads from the loading station to the unloading station, a single track over which said car reciprocates, means causing the car to reciprocate continuously over said track past said stations, and means for loading the car as it travels past the loading station in one direction and for unloading the car as it travels past the unloading station in the opposite direction, said loading means being set for such use by the car as it travels past the loading station in the opposite direction.

2. A conveyer comprising a loading station, an unloading station, a car adapted to transport loads from the loading station to the unloading station, a single track over which said car reciprocates, means causing the car to reciprocate continuously over said track past said stations, and means for loading the car as it travels past the loading station in one direction and for unloading the car as it travels past the unloading station in the opposite direction, said last named means being automatically operated by said car as it travels past the stations in the directions opposite to those in which the car is loading and unloading.

3. A conveyer comprising a loading station, an unloading station, a car adapted to transport loads from the loading station to the unloading station, a singe track over which said car reciprocates, means causing the car to reciprocate continuously over said track past said stations, and means in the path of travel of the car for loading the car as it travels past the loading station in one direction and for unloading the car as it travels past the unloading station in the opposite direction, said last-named means being moved out of such path of travel by the car as it travels past the stations in the directions opposite to those in which the car is loaded and unloaded.

4. A conveyer comprising a loading station, an unloading station, a car adapted to transport loads from the loading station to the unloading station, a single track over which said car reciprocates, means causing the car to reciprocate continuously over said track past said stations, and means in the path of travel of the car for loading the car as it travels past the loading station in one direction and for unloading the car as it travels past the unloading station in the opposite direction, said last named means being automatically moved by said car into and out of such path of travel.

5. A conveyer comprising a loading station, an unloading station, a car adapted to transport loads from the loading station to the unloading station, and means for reciprocating said car past said stations, each station including a shelf movable into and out of the path of travel of the car and means actuated by the car for moving the shelf of each station into such path as the car travels in one direction and out of such path as the car travels in the opposite direction.

6. A conveyer comprising a loading station, an unloading station, a car adapted to transport loads from the loading station to the unloading station, and means for reciprocating said car past said stations, each station including a shelf movable into and out of the path of travel of the car, and trip elements projecting into such path of travel, and said car being provided with fingers which engage said elements to move the shelves into such path as the car travels in one direction and out of such path as the car travels in the opposite direction.

7. A conveyer comprising a loading station, an unloading station, a car adapted to transport loads from the loading station to the unloading station, and means for reciprocating said car past said stations, each station including a shelf movable into and out of the path of travel of the car, and trip elements, one of which projects into such path of travel when the shelf is in the path and the other of which projects into such path of travel when the shelf is out of the path and said car being provided with fingers which engage the elements to move the shelves into such path as the car travels in one direction and out of such path as the car travels in the opposite direction.

8. A conveyer comprising a loading station, an unloading station, a car adapted to transport loads from the loading station to the unloading station and means for continuously reciprocating said car past said stations, each station including a shelf movable into and out of the path of travel of the car and means actuated by the car for moving the shelf of each station into such path as it travels past the station in one direction and for moving the shelf of each station out of such path as it travels past the station in the opposite direction.

9. A vertical conveyer comprising a loading station, an unloading station, a car adapted to receive loads at the loading station, transport them to the unloading station and deliver them thereto, and means for continuously reciprocating the car in a vertical straight line past said stations, each station including a shelf adapted to be lowered into and raised out of the path of travel of the car and two trip elements, one of which projects into such path when the shelf is lowered and the other of which projects into such path when the shelf is raised and said car being provided with vertically spaced fingers which engage said trip elements to raise the shelves at both stations as the car ascends and to lower the shelves at both stations as the car descends.

10. A vertical conveyer comprising a loading station, an unloading station, a car adapted to receive loads at the loading station, transport them to the unloading station and deliver them thereto, and means for continuously reciprocating the car in a vertical straight line past said stations, each station including a shelf adapted to be lowered into and raised out of the path of travel of the car and two trip elements, one of which projects into such path when the shelf is lowered and the other of which projects into such path when the shelf is raised and said car being provided with vertically spaced fingers which engage said trip elements to raise the shelves at both stations as the car ascends and to lower the shelves at both stations as the car descends, each finger thus causing the shelf at one station to raise and the shelf at the other station to lower.

11. A vertical conveyer comprising a loading station, an unloading station, a car adapted to receive loads at the loading station, transport them to the unloading station and deliver them thereto, and means for continuously reciprocating the car in a vertical straight line past said stations, each station including a shelf adapted to be lowered into and raised out of the path of travel of the car and two trip elements, one of which projects into such path when the shelf is lowered and the other of which projects into such path when the shelf is raised and said car being provided with vertically spaced fingers, each of said trip elements being so mounted that upon engagement by a finger when the car is travelling in one direction, it will move the shelf associated therewith and upon engagement by a finger when the car is travelling in the opposite direction, it will yield without moving such shelf.

12. In a conveyer of the class described an unloading station, a car for delivering loads thereto, and means for operating said car, said station comprising a shelf to which loads are delivered by the car, a platform to which said loads pass from the shelf and a plate between said shelf and said platform and over which the loads pass on their way to the platform, means actuated by said plate when a load passes thereover and means actuated by said car, said means being so related to each other that the concomitant actuation of both such means stops the car operating means.

13. In a conveyer of the class described an unloading station, a car for delivering loads thereto and an electric motor for operating said car, said station comprising a shelf to which loads are delivered by the car, a platform to which said loads pass from the shelf and a plate between said shelf and said platform and over which the loads pass on their way to the platform, a circuit breaker in the motor circuit actuated by said plate when a load passes thereover, and a second circuit breaker in such circuit actuated by said car, the concomitant actuation of both circuit breakers opening the motor circuit and stopping the motor.

14. In a conveyer of the class described two loading stations, a car for receiving loads from either of said stations, means for operating said car and means operable when a loading station is set to load the car for preventing the operation of said first-named means and operable when a loading station is not so set to permit such operation, whereby, when both stations are set to load the car, the car is at rest and so remains until one station is no longer set to load.

15. In a conveyer of the class described two loading stations, a car for receiving loads from either of said stations, an electric motor for operating said car and a circuit breaker in the motor circuit at each loading station which, when a loading station is set to load the car opens said circuit, and when a loading station is not so set closes said circuit, said circuit breakers being arranged in parallel, whereby, when both stations are set to load the car, the car is at rest and so remains until one station is no longer set to load.

16. A conveyer comprising two loading stations, an unloading station, a car adapted to transfer loads from either of said loading stations, an electric motor for operating said car, a circuit breaker in the motor circuit at each loading station, the circuit breaker at the loading station set to load the car opening said motor circuit and the circuit breaker at the loading station not so set closing said circuit, said circuit breakers being arranged in parallel, whereby, when both stations are set to load the car, the car is at rest and so remains until one station is no longer set to load.

17. In a conveyer of the class described two loading stations, a car for receiving loads from each of said stations, means for reciprocating said car along a path of travel past said stations, each station including a loading shelf movable into and out of said path and means operable by said shelf for controlling the operation of said car reciprocating means, which means prevent the operation of said reciprocating means when the shelf is in the path of travel of the car, and permit such operation when the shelf is out of such path, said shelf operable means acting independently whereby when the shelves of both stations are in the path of travel of the car the operation of the car reciprocating means is prevented.

18. In a conveyer of the class described two loading stations, a car for receiving loads from each of said stations, an electric motor for reciprocating said car along a path of travel past said stations, each station including a loading shelf movable into and out of such path of travel and a circuit breaker in the motor circuit operable by said shelf, said circuit breakers being arranged in parallel, each circuit breaker being opened when the shelf associated therewith is in the path of travel of the car and closed when such shelf is out of that path, whereby when both the shelves are in the path of travel of the car the motor circuit is open and the car at rest.

ALBERT N. KLYVER.